US010503205B2

(12) United States Patent
Spevak

(10) Patent No.: US 10,503,205 B2
(45) Date of Patent: Dec. 10, 2019

(54) DEVICE CASE WITH ILLUMINATION SOURCES

(71) Applicant: Jakob Spevak, Beverly Hills, CA (US)

(72) Inventor: Jakob Spevak, Beverly Hills, CA (US)

( * ) Notice: Subject to any disclaimer, the term of this patent is extended or adjusted under 35 U.S.C. 154(b) by 145 days.

(21) Appl. No.: 15/789,524

(22) Filed: Oct. 20, 2017

(65) Prior Publication Data

US 2019/0121392 A1 Apr. 25, 2019

(51) Int. Cl.
*G06F 1/16* (2006.01)
*G03B 15/05* (2006.01)
*F21V 33/00* (2006.01)
*A45C 11/00* (2006.01)

(52) U.S. Cl.
CPC ........ *G06F 1/1628* (2013.01); *F21V 33/0052* (2013.01); *G03B 15/05* (2013.01); *A45C 2011/002* (2013.01); *A45F 2200/0516* (2013.01); *G06F 1/1626* (2013.01)

(58) Field of Classification Search
CPC combination set(s) only.
See application file for complete search history.

(56) References Cited

U.S. PATENT DOCUMENTS

| | | | |
|---|---|---|---|
| 8,428,644 B1 | 4/2013 | Harooni | |
| 9,294,601 B2 | 3/2016 | Hammond et al. | |
| 9,593,842 B2 | 3/2017 | Shoemake et al. | |
| 2008/0014995 A1* | 1/2008 | Noba | H04M 1/0214 |
| | | | 455/566 |
| 2012/0033414 A1* | 2/2012 | Sharrah | F21L 4/04 |
| | | | 362/183 |
| 2015/0355525 A1* | 12/2015 | Abrams | G03B 15/02 |
| | | | 348/207.11 |
| 2017/0146890 A1* | 5/2017 | Shoemake | G03B 15/05 |

FOREIGN PATENT DOCUMENTS

CN 304309092 S 10/2017

* cited by examiner

*Primary Examiner* — Evan P Dzierzynski
(74) *Attorney, Agent, or Firm* — Cohen IP Law Group, P.C.; Michael N. Cohen

(57) ABSTRACT

A protective case for an electronic device is disclosed. The protective case may also provide a light source to be used with the front-side camera and the backside camera of the electronic device. The light source may pivot between different positions in order to emit light in the proper direction. The protective case may also include at least one power source to power the electronic device as well as the light source.

18 Claims, 5 Drawing Sheets

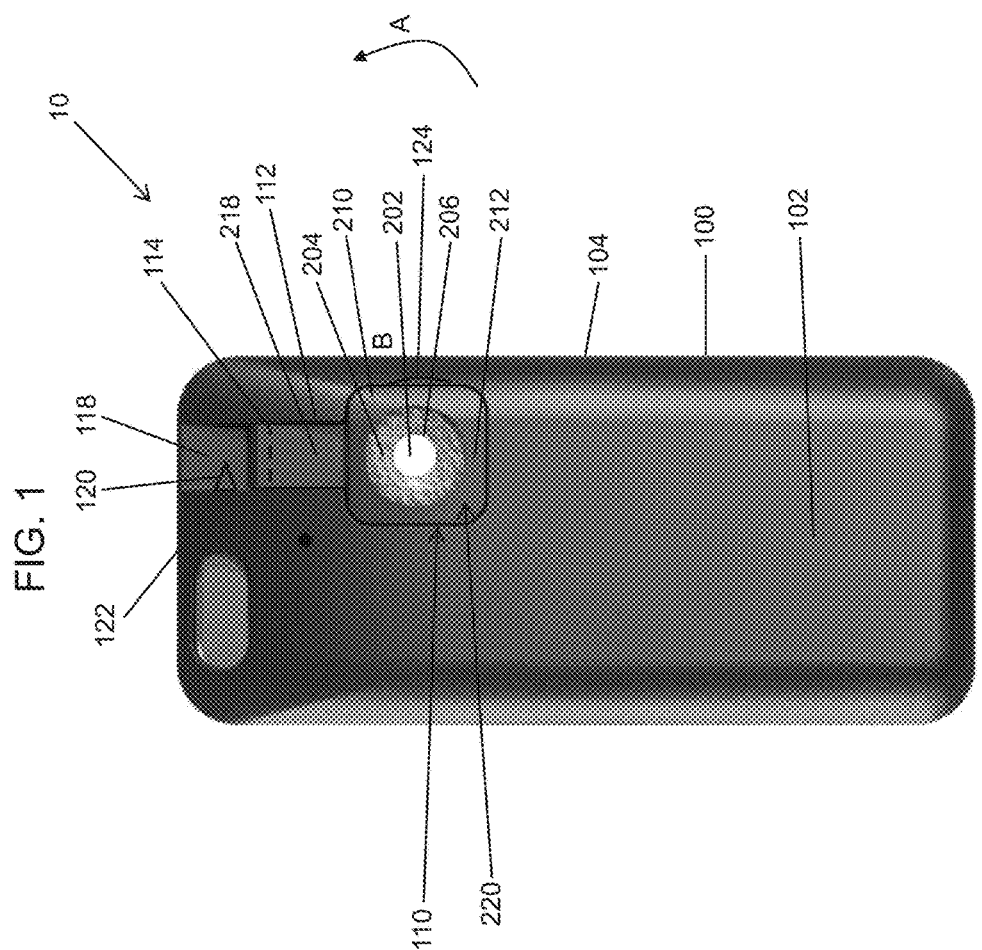

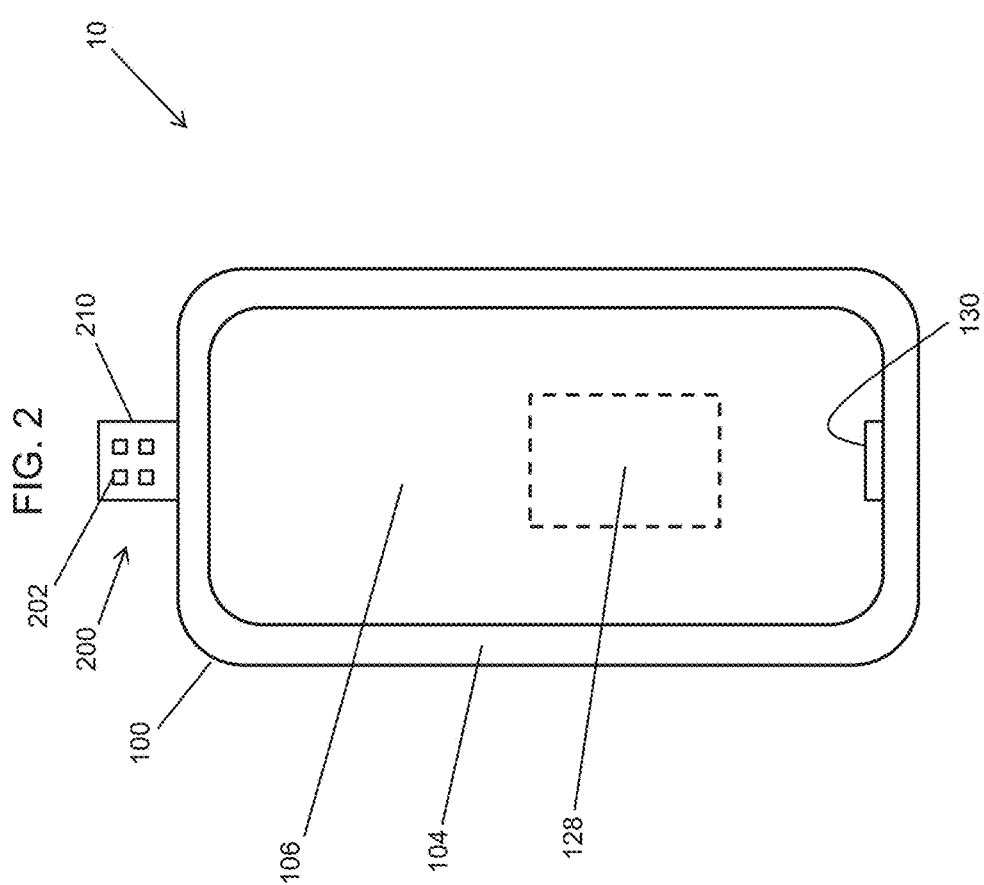

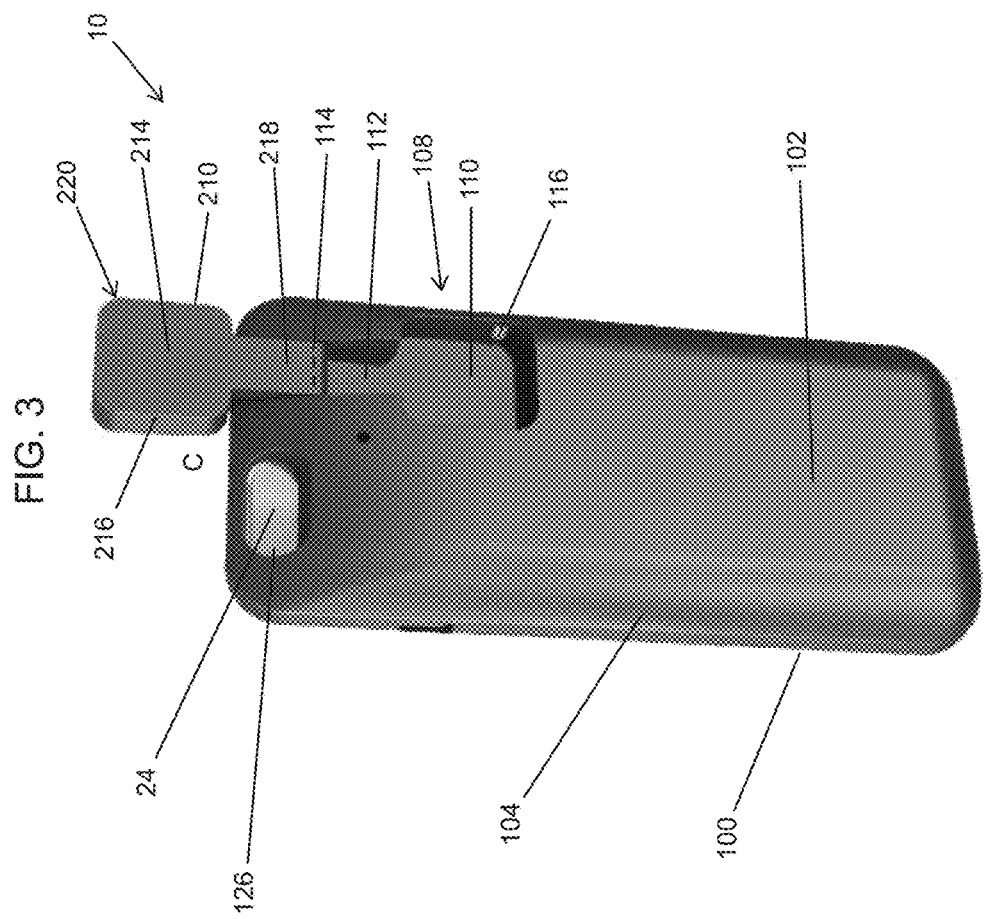

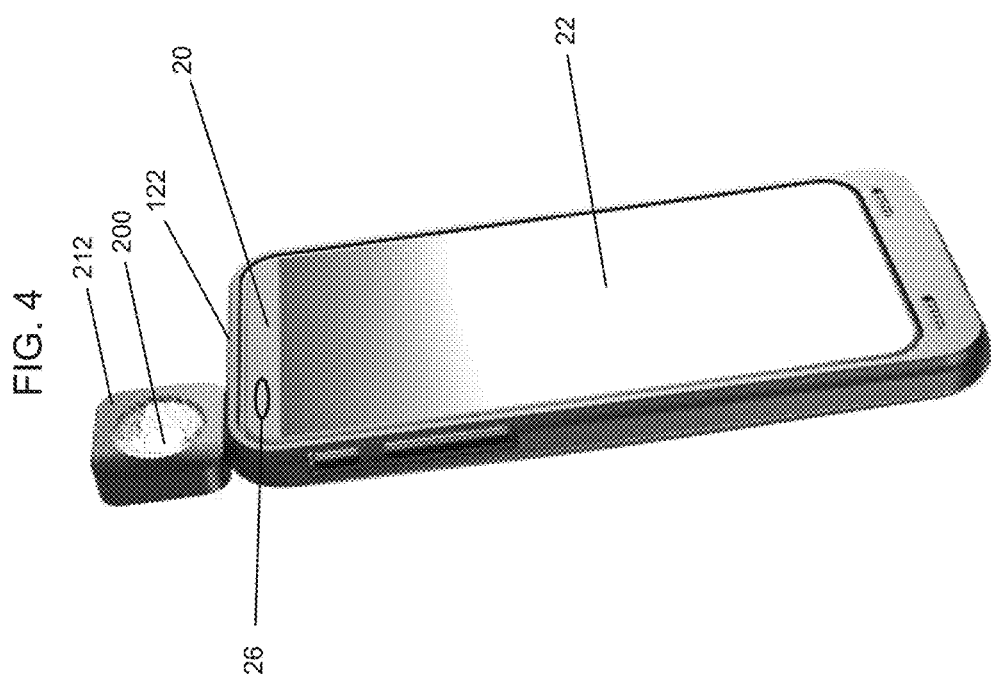

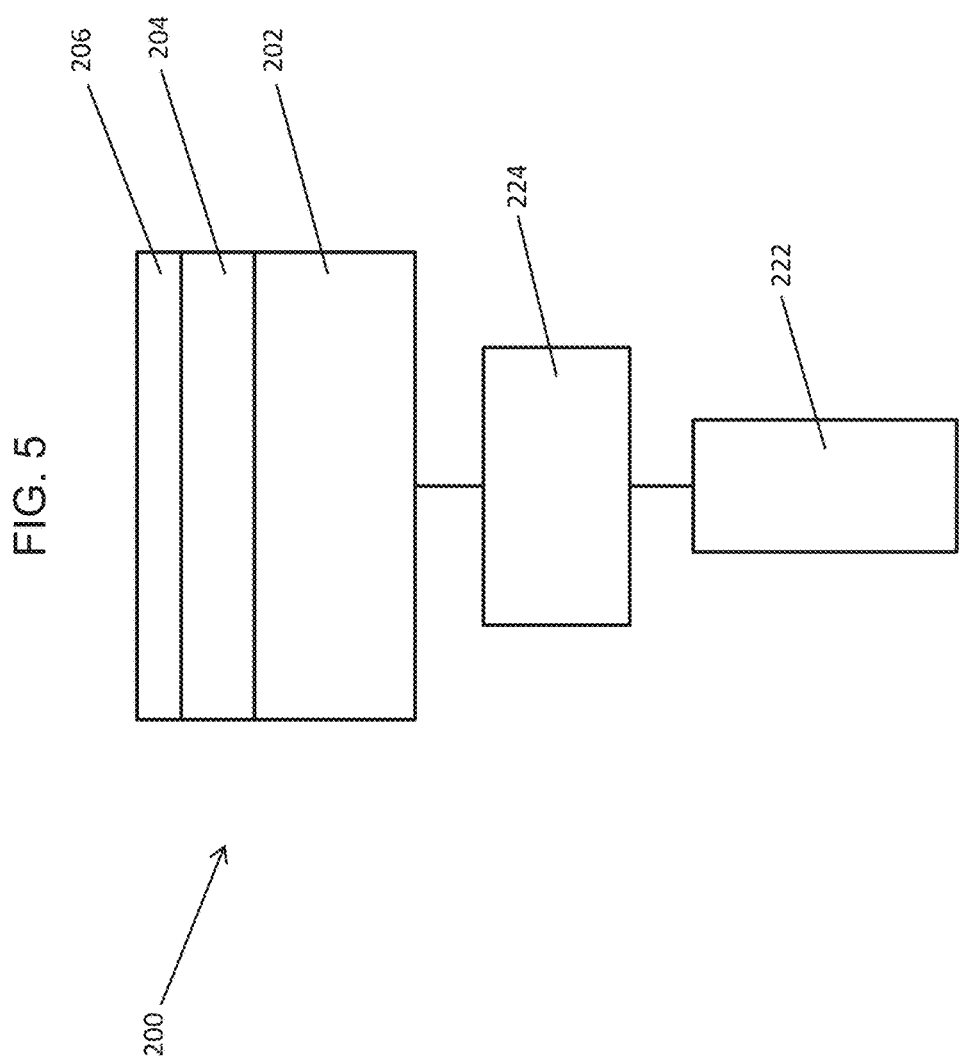

DEVICE CASE WITH ILLUMINATION SOURCES

FIELD OF THE INVENTION

The current invention generally relates to a protective case for electronic devices and that includes an illumination device. In particular, the invention relates to a protective smart phone case that includes a light source to provide lighting for the phone's front-side and backside cameras. The case may also include a battery pack to power the light source and to charge the phone.

BACKGROUND OF THE INVENTION

Mobile phones with additional functionalities, also known as smartphones, have become ubiquitous. Today's smartphones include an operating system and software applications that allow the devices to perform a wide variety of functions ranging from voice calling and texting, to web browsing, games, music and much, much more.

However, of all the functionalities of smartphones, smartphone camera usage remains one of the top uses for smartphones today. In addition, most smartphones include display screens (predominately touch screens) on the front-side of the device that can be used to view the object of interest for the photography. That is, the object of interest for the photography is displayed and viewed directly on the display screen of the device in lieu of peering through a lens aperture.

Typical smartphones on the market may have up to two cameras: one on the backside for taking traditional photographs or video, and one on the front-side that may allow the user to take pictures or videos of himself/herself, or what is known as "selfies". The front-side camera may also be used for video chatting and/or "vlogging". The user chooses what camera they wish to use and the device displays the object of interest (either the view from the front-side camera or the view from the backside camera) on the device's display.

These cameras typically come with a light source (a flash) configured with the backside camera, but no flash configured with the front-side camera. And because of this, the ability to take quality photographs or video in dark or dimly lit conditions with the front-side camera may be significantly limited. Accordingly, there is a need for a flash for front-side cameras on smartphones.

In addition, the flashes configured with the backside cameras are many times low intensity which may result in inadequate illumination of the object of interest. As such, there is a need for higher intensity flashes for backside cameras on smartphones.

Also, many users may wish to use the front-side cameras and the backside cameras interchangeably depending on the application, and current illumination accessories on the market may provide illumination for one side or the other, but not adequately for both interchangeably. Others may include a fixed illumination device for the front side camera and a separate and fixed illumination device for the backside camera, but these may significantly increase the size and form factor of the accessory due to the need for two illumination devices. Accordingly, there is a need for a device that may provide both a flash for the front-side camera of a smartphone, as well as a flash for the backside camera, and that may do so while keeping the size and form factor of the accessory to a minimum.

It should also be noted that because light sources require power, there is a need to provide power to said front-side cameras and backside cameras, and to the smartphone itself.

SUMMARY OF THE INVENTION

In a first aspect of the invention, a device is described that provides a protective shell for electronic devices. The device may be a protective case and the device may also include a lighting assembly that may be a set of LEDs, bulbs or other types of light sources.

In another aspect of the invention, the lighting assembly may include a light source, a reflector, a lens and electronics.

In another aspect of the invention, the lighting assembly may be configured within a casing that may be configured with the protective case.

In another aspect of the invention, the casing may be configured with the protective case in a way that may allow it to transition from a first position to a second position. The first position may generally be a lower position and the second position may generally be an upper position.

In another aspect of the invention, the first position of the casing may position the lighting assembly to emit light in a first direction.

In another aspect of the invention, the second position of the casing may position the lighting assembly to emit light in a second direction.

In another aspect of the invention, the casing may transition from the first position to the second position by rotating about a hinge.

In another aspect of the invention, the electronic device that may be protected by the protective case may be a smartphone or a tablet computer.

In yet another aspect of the current invention, the electronic device may include two cameras, with one camera on its front-side and one camera on its backside.

In another aspect of the invention, the casing while in the first position may position the lighting assembly to emit light to help illuminate objects while using the front-side camera.

In another aspect of the invention, the casing while in the second position may position the lighting assembly to emit light to help illuminate objects while using the backside camera.

In another aspect of the invention, the protective case may include a battery that may be used to charge or otherwise power the electronic device, as well as the lighting assembly.

In another aspect of the invention, the lighting assembly may include a dedicated power source to power said lighting assembly.

In yet another aspect of the invention, an application, or "app", may be provided and installed onto the electronic device that may assist the user in controlling the various characteristics or elements of the invention.

In another aspect of the invention, the app may allow the user to control parameters of the lighting assembly such as the output intensity, the timing of the flash or other parameters. The app may also allow the user to turn on and off the lighting assembly to that it can be used as a general light source.

In another aspect of the invention, the invention may interface with the electronic device via a jack/receptacle, or through wireless technologies such as Bluetooth.

In another aspect of the invention, the user may control, set parameters and otherwise interact with the invention directly through the electronic device without an app.

In yet another aspect of the invention, the casing and the lighting assembly may be removable from protective case.

In another aspect of the invention, different casings and lighting assemblies may be configured and installed with the protective case.

In another aspect of the invention, the casing may be configured with the protective case so that it slides from the first position to the second position. In this example, the casing may have lighting assemblies on both its front side and its back side and/or may swivel.

In another aspect of the current invention, additional devices, components or elements may be configured with the protective case to have a lower position and/or an upper position. In one example, the additional device may be a camera.

In another aspect of the current invention, the invention may include other elements such as a stand, a microphone and other elements.

Other aspects of the invention are discussed herein.

BRIEF DESCRIPTION OF THE DRAWINGS

FIG. 1 is a back view of an electronic device configured with a protective case with an illumination assembly in a lower position.

FIG. 2 is a front view of a protective case for an electronic device with an illumination assembly in an upper position.

FIG. 3 is a back perspective view of an electronic device configured with a protective case with an illumination assembly in an upper position.

FIG. 4 is a front perspective view of an electronic device configured with a protective case with an illumination assembly in an upper position.

FIG. 5 is a block diagram of a lighting assembly.

DETAILED DESCRIPTION OF THE PREFERRED EMBODIMENTS

The following detailed description is not intended to limit the current invention. Alternate embodiments and variations of the subject matter described herein will be apparent to those skilled in the art.

The device 10 of the current invention is now described with reference to the figures. Where the same or similar components appear in more than one figure, they are identified by the same or similar reference numerals.

In general, device 10 may provide a protective shell or case for electronic devices such as smartphones, tablet computers, laptop computers, PDAs, portable music players and other types of devices. In addition, device 10 may include an illumination device that may be used as a source of light. The light may be used in conjunction with other functionalities or components of the electronic device such as with the front or rear cameras to illuminate the object of interest for the photograph, or as a stand-alone source of light similar to a flashlight. The device 10 may also include one or more sources of power such as a battery, a solar panel or other types of power sources. The power source(s) may provide power to the illumination device as well as to charge or otherwise power the electronic device.

In one example as depicted in FIG. 1 and FIG. 2, the device 10 may include a protective assembly 100 or shell that may generally include a case for electronic devices such as smartphones, tablet computers or other types of devices. Protective assembly 100 may comprise Polyurethane, Polycarbonate, carbon fiber, wood, natural leather, synthetic leather, metal or other materials that may be suitable to provide protection to the electronic device 20. As shown in FIG. 4 and well known in the art, an electronic device 20 may generally fit snugly inside protective assembly 100 such that protective assembly 100 may generally cover and protect the back, sides and possibly a portion of the front of the electronic device 20. However, it may be preferable that a portion of the front of the electronic device 20 remain uncovered such that a user may gain access to any interface, touchscreen or other types of controls that may be on the front side. Accordingly, protective assembly 100 may include a back 102, sides 104 and an inner area 106 that may be defined by the back 102 and sides 104. As such, electronic device 20 may fit within inner area 106 and be generally protected by device 10.

Device 10 may also include an illumination assembly 200 as depicted in FIGS. 1, 2, 3 and 4. Illumination assembly 200 may generally include one or more light sources 202, one or more reflectors 204, one or more lens 206, electronics 208, and a casing 210. Illumination assembly 200 may also include a power source such as a battery but this may or may not be required depending on the application as will be described in later sections.

Light source 202 may include light emitting diodes (LEDs), incandescent lights, halogen lights, xenon lights, fluorescent lights, high-intensity discharge lights or other types or combinations of light sources. As shown in FIG. 1 and FIG. 4, light source 202 may be configured with casing 210 such that light that may be emitted by light source 202 may be generally directed outward from casing 210. As such, the light may be directed in different directions depending on the orientation of casing 210. Casing 210 may be constructed from similar or different materials as protective shell 100 and may include a body 220 that may include a front 212, a back 214 (best seen in FIG. 3), and sides 216 (best seen in FIG. 3), and light source 202 may be centrally located within the front 212 of body 220. However, light source 202 may also be located in other areas with respect to casing 210. Note that casing 210 may also include neck 218 as shown in FIG. 3.

In addition, one or more reflectors 204 may be configured with light source 202 such that reflector 204 may reflect or otherwise direct light emitted by light source 202 outward from the casing 210. Reflector 204 may be a curved reflective surface with a central opening that may encircle light source 202 and may be generally positioned behind and to the sides of the light source 202. In this configuration, light source 202 may be generally located in the central opening of reflector 204. As is well known in the art, reflectors 204 used to direct light may be parabolic, hemispherical, or conical or may include other shapes. In this way, reflector may reflect the light emitted from light source 202 as generally collimated rays that may be generally parallel with one another. Given this, the result may be a generally collimated beam of light that may be emitted by light source 202 and reflector 204. Note that if light source 202 includes multiple LEDs, each LED may include its own dedicated reflector 204. Note also however that reflector 204 may be optional.

Also, illumination assembly 200 may include one or more lenses 206 that may be configured with light source 202 and reflector 204. It may be preferable that lens 206 be configured to cover light source 202 and reflector 204 so that lens 206 may provide a protective shield to the components as well as focusing, broadening or otherwise affecting the light beams that may pass through it. Lens 206 may be constructed from glass, plastic or other types of materials and it may be preferable that it be transparent to allow the light to pass through it with minimal loss or distortion, as well as rugged to withstand blows, scratches or other adverse phenomena that may occur. In addition, lens 206 may be convex to focus the beams of light that may pass through it, concave to broaden the beams of light that may pass through it, or may be any other types or combinations of types of lenses 206 such as Fresnel lenses. Lens 206 may also be colored in order to add color to the emitted light. Note that lens 206 may also include a flat lens that may not focus or broaden the beam of light, but may simply allow the beam to pass through generally unaffected. In this way, lens 206 may act as a transparent cover to light source 202. In addition, lens 206 may comprise a first lens 206 that may affect the beam of light as well as a second lens 206 configured on top of the first lens 206 that may serve as a protective cover to light source 202. It can be seen that any number of lenses in any different configurations may be used. In addition, lens 206 may be removable from casing 210 so that it may be replaced with a different lens 206. In this way, lens 206 may be chosen for optimal performance depending on the application and the environmental conditions. Note that if light source 202 includes multiple LEDs, each LED may include its own dedicated lens 206. Note also however that lens 206 may be optional.

It may be preferable that light source 202, reflector 204 and lens 206 be configured together within casing 210 in a way that results in the casing 210 being air and water tight with no gaps or openings. In this way, light source 202 and the other components within the casing (including electronics 208 as will be described in later sections) may be protected from outside environmental elements such as water and dirt.

Moving forward, as shown in FIG. 3, protective assembly 100 may include a configuration area 108 that may allow casing 210 to be configured with protective assembly 100. In one example, configuration area 108 may include a lower cavity 110 that may be shaped and configured to generally receive the body 220 of casing 210, and an upper cavity 112 that may be shaped and configured to generally receive the neck 218 of casing 210. As shown in FIG. 1, the body 220 of casing 210 may generally fit within lower cavity 110 such that the front 212 of casing 210 may be generally flush with the back 102 of protective shell 100 and be free of gaps between the two components. In this configuration, it can be seen that the neck 218 of casing 210 may also fit into upper cavity 112 of configuration area 108.

Configuration area 108 may also include a rotatable mount 114 that may rotatably secure the top end of neck 218 within upper cavity 112. Rotatable mount 114 may be in the form of a pin that may be secured in the sides of upper cavity 112 and that may pass through the top end of neck 218 (depicted in FIGS. 1 and 3 as dashed lines) such that the neck 218 may rotate about the pin. Or, the rotatable mount 114 may be in the form of a hinge or other type of rotatable mount device. In this way, it can be seen that when casing 210 is rotated upward in the direction of arrow A in FIG. 1, it may transition from a lower position B generally flush with back 102 within lower cavity 110, to an upper position C (shown in FIG. 3). In this position, it can be seen in FIGS. 3 and 4 that the body 220 of casing 210 may be generally positioned above the top side 122 of protective shell 100 or at least in a configuration that may allow light source 202 to emit light in a direction suitable for use with the device's front-side camera. Note that detent 116 may generally hold casing body 220 within lower cavity 110 until sufficient force is applied to rotate casing 210 upward.

In addition, as casing 210 rotates upward about rotatable mount 114, neck 218 may generally rotate out of upper cavity 112 and into top cavity 118 (shown in FIG. 1). Top cavity 118 may be shaped and configured to receive neck 218 as casing 210 rotates up and into position C. Also, it may be preferable for the body 220 of casing 210 to rotate into position C without any obstructions, for example, without obstruction from top side 122 of protective shell 100. It may also be preferable that top cavity 118 include detent 120 to generally hold neck 218 in top cavity 118 until sufficient force is applied to rotate casing 210 back downward into lower position B. It can then be seen that casing 210 may be returned to lower position B by rotating it back down in the direction generally opposite of arrow A to configure it back into lower cavity 110. Note also that lower cavity 110, upper cavity 112 and top cavity 118 may be optional and that casing 210 and neck 218 may generally rest against the back side of protective case 210.

In addition, protective assembly 100 may include groove 124 that may be adjacent to the outer edge of lower cavity 110 as shown in FIG. 1. Groove 124 may allow the user to use his/her fingernail or other type of instrument to access the outer side 216 of casing 210 in order to nudge it out of lower cavity 110 in order to rotate it upward into top position C. It may also be preferable for casing 210 to include a small lip or groove in its side wall that may coincide with groove 124 to better allow the user to nudge it out of lower cavity 110. Other mechanisms or methods may also be used to accomplish this such as a release button, a lever, or other mechanisms.

It should be noted that electronic device 20 may have at least two distinct cameras as is commonplace in the market: a backside camera 24 (as seen through cut-out 126 in protective shell 100 in FIG. 3) on its back side for taking traditional pictures, and a front-side camera 26 (as seen in FIG. 4) on its front side 22 for taking pictures of the user or what may be referred to as "selfies". Front-side camera 26 may also be used for video chatting and/or "vlogging". In addition, most smartphones include a display screen 28 (predominately touch screens) on the front-side of the device that can be used to view the object of interest for the photography. In this case, the object of interest for the photography may be displayed and viewed directly on the display screen 28 of the device in lieu of peering through a lens aperture. Note however that a lens aperture may also be used for this purpose.

Accordingly, while in lower position B, it may be preferable for lighting assembly 200 to generally point or otherwise face in the same direction as backside camera 24 so that lighting assembly 200 may provide illumination for the use of the backside camera 24 in this configuration. In addition, while in the upper position C, it may be preferable for lighting assembly 200 to generally point or otherwise face in the same direction as front-side camera 26 so that lighting assembly 200 may provide illumination for the use of front-side camera 26 in this configuration. However, note that lighting assembly 200 may emit light beams in any direction with respect to backside camera 24, front-side camera 26 and electronic device 20 in general. Note that front-side camera 26 and backside camera 24 may take photographs or videos, or may be used to scan or otherwise save other types of images, and that lighting assembly 200 may be utilized with any functionalities of cameras 24, 26 as required. Also note that lighting assembly 200 may provide illumination in the form of a flash, steady state or other forms of lighting.

Moving forward, protective assembly 100 may include a power source 128 (FIG. 2), such as a battery, a solar panel or other type of power source that may be used to charge or otherwise power electronic device 20 as well as lighting assembly 200. Power source 128 may be located in the body of protective assembly 100 or in any other area and it may be preferable that power source 128 not obstruct or otherwise interfere with device 20 within protective assembly 100. In addition, lighting assembly 200 may include its own dedicated power source 222 (shown in block diagram FIG. 5), such as a battery, a solar panel or other type of power source that may be used to charge or otherwise power lighting assembly 200. Power source 222 may be located within casing 210 or in any other location. In the case of a power source 128 that may charge or otherwise power electronic device 20, protective assembly 100 may include a power jack 130 that may be configured to mate with the power receptacle of electronic device 20 when electronic device 20 is installed within protective assembly 200 so that it may provide power to electronic device 20 thereto.

Also, power sources 128, 222 may be charged by inductive charging, through direct charging with use of a power cable/jack/receptacle, through solar panels or through other charging methods or means. In addition, power sources 128, 222 may be removable such that they may be removed and recharged and/or replaced with replacement power sources 128, 222 as necessary.

In addition, lighting assembly 200 may include electronics 224 (FIG. 5) that may be included within casing 210 that may control, maintain or otherwise affect lighting assembly 200. For example, the electronics 224 may include a power transformer to deliver the correct voltage and current to the light sources 202 of lighting assembly 200. Also, the electronics may include a microprocessor that may control the output intensity, the flash, or other characteristics or components of lighting assembly 200. In addition, electronics 224 may interface with software on the electronic device or with an application (or "app") that may be installed on electronic device 20 as described in later sections. Also, electronics 224 may be configured to receive triggers from the electronic device 20 that may allow it to synch the lighting assembly 200 flash to properly coincide with the taking of the picture in order to optimize the illuminating of the object of interest. Accordingly, the electronics 224 may include functionality to determine the position of casing 210 (either in lower position B, upper position C or in other positions) so that it may properly receive the flash triggers from the correct camera (either the front-side camera or the backside camera for example). This functionality may also include sensors within the configuration area 108 or casing 210 that may sense which position casing 210 may be positioned. Note that the electronics may include any electrical or non-electrical components that may be necessary to control or otherwise affect the lighting assembly 200, or other components of device 10 as required.

It may be preferable for device 10 to include an application or "app" that may be provided and installed onto electronic device 20. The app may include an interface, control dashboard or other types of administration dialog that may allow the user to adjust the settings and generally control the lighting assembly 200 as well as other components and parameters of device 10 such as the power sources 128, 222. For example, the app may include a setting to set the lighting assembly as a flash for the cameras 24, 26 so that it may flash at the required time during the taking of the pictures in order to properly illuminate the objects of interest. In addition, the app may include an On/Off switch that may allow the user to turn on the lighting assembly 200 for use as a flashlight. Other settings may include the output intensity of the lighting assembly 200 as well as other settings.

Note that jack 130 on protective assembly 100 may engage the control jack receptacle of electronic device 20 when electronic device 20 may be configured with protective assembly 100 so that it may act as an input/output port for control commands between the app and the lighting assembly 200. In this way, the app may communicate with the lighting assembly 200 (for example with the electronics 224) in order to adjust its settings and generally control its functionality. Other types of connecting or pairing between electronic device 20 and lighting assembly 200 may also be used such as Bluetooth as well as other types of pairing and/or wireless technologies.

During use, the user may adjust the settings of lighting assembly 200 through use of the app as described above, and then may prepare to take photographs or videos using cameras 24, 26 on the electronic device 20. For example, if the user desires to take a traditional picture using the backside camera 24, the user may position lighting assembly 200 into lower position B and then set it to be a flash for the camera 24 using the app or native controls on electronic device 20. The user may also adjust other parameters such as output intensity. Once everything is set, the user may take the picture and lighting assembly 200 may receive a flash trigger and subsequently illuminate the object of interest. It should also be noted however that the user may not need to set the parameters or settings of the lighting assembly 200, and that instead, the device 10 may have the ability to configure the proper settings and parameters itself. For instance, the device 10 may have sensors and/or electronics 224 that may determine when the casing 210 is in the lower position B, in the upper position C, or in other positions. Accordingly, when the user places the casing 210 into these positions B, C, the device 10 may automatically set which camera 24, 26 may be used with the lighting assembly 200 such that lighting assembly 200 may receive the proper trigger to flash from the proper camera 24, 26. Device 10 may also include a light sensor that may measure the amount of ambient light, and then use this measurement data to set the output intensity of the lighting assembly 200 in order to properly illuminate the object of interest with adequate lumens.

In another example, if the user desires to take a "selfie" using the front-side camera 26, the user may disengage the casing 210 from the lower cavity 110 and rotate it upward in the direction of arrow A in FIG. 1 into the upper configuration C of FIG. 3. In this position, lighting assembly 200 may generally face the same direction as the front-side camera 26. When the user takes the picture, lighting assembly 200 may receive the flash trigger such that it may properly illuminate the object of desire. Note that as with the example above, the user may set the controls for this to take place within the controls of electronic device 20, or within the app, or the device 10 itself may make the necessary settings. Similar procedures may be used for taking video footage using cameras 24, 26.

It should also be noted that the app as described above may not be required and that lighting assembly 200 may be controlled directly by the electronic device 20 without the intervention of the user. In this way, the user may not need to turn on or otherwise set the lighting assembly 200 as the flash, but may simply position the lighting assembly 200 (for example, configure it to position B or to position C) and take the photograph or video. The electronic device 20 may interact with the electronics 224 of lighting assembly 200 via control jack 130, Bluetooth or other pairing technologies in order to trigger the lighting assembly 200 to flash or otherwise operate in synch with the cameras 24, 26. Note that the electronic device 20 may also control other aspects of the lighting assembly 200 such as the output intensity and other aspects.

In addition, if the user wishes to use the lighting assembly 200 as a flashlight or other general source of light, the user may use the app to turn the lighting assembly on. Note that casing 210 may be in either lower configuration B, in the upper configuration C or in any other position while being used as a general light source. In addition, the app may not be required and the user may turn on the lighting assembly 200 as a flash light by utilizing the controls of the electronic device 20. In this example, the user may turn on the native light on the electronic device 20 to be used as a flashlight which may in turn also turn on the lighting assembly 200 light source 202. Other types of controls on the electronic device 20 may also be used to control lighting assembly 200.

Also, it may be preferable for casing 210 and lighting assembly 200 to be removable from the configuration area 108 of protective assembly 100. In this example, casing 210 may be removed from and reattached to neck 218. Casing 210 may be removably attached to the top of neck 218 using a snap mechanism, a slot mechanism, a latch, a lock or other types of attachment mechanisms that may adequately secure casing 210 to neck 218 while allowing it to be removed when desired. In addition, both casing 210 and neck 218 may be both removed together.

In this way, light assembly 200 may be removed from protective assembly 100 and placed in a different location that may improve its ability to illuminate the object of interest for the photography or videography. In addition, this may allow lighting assembly 200 to be used as a general light source to illuminate a book, a room, an outside area, or any other area or object that may require illumination. Also, lighting assembly 200 may include a stand or clip or other type of mount or accessory that it may be attached to for use when removed from protective assembly 100.

In this example, it may be preferable for lighting assembly 200 to be paired with electronic device 20 using Bluetooth technology or other type of wireless technology such that electronic device 20 and/or the app may be able to wirelessly control lighting assembly 200 even when it is disconnected from protective assembly 100. It may also be preferable for lighting assembly 200 to include its own dedicated power source 222 so that it may be powered when disconnected from protective assembly 100. However, note that lighting assembly may utilize the main power source 128 of device 10 when attached to protective assembly 100 in order to conserve the charge of battery 222. Also, hard wiring or cabling may be utilized to provide electrical connectivity between lighting assembly 200 and electronic device 20 and/or the app in order to provide control commands as well as power to the assembly 200.

Because casing 210 and lighting assembly 200 may be removed from configuration area 108, it should be noted that different casings 210 with different lighting assemblies 200 may be utilized with device 10. That is, one casing 210 with a particular lighting assembly 200 that may include a particular light source 202, reflector 204, lens 206 and electronics 224 may be replaced with a different casing 210 with a different lighting assembly 200 that may include a different light source 202, reflector 204, lens 206 and electronics 224. For example, one lighting assembly may include a brighter light source 202 than the other, a wider profile lens 206, or even a different colored lens 206 or different colored light source 202. It can be seen that different lighting assemblies 200 may be chosen and used for different photography, videography, or general lighting applications (for example, low light vs. bright light, indoor vs. outdoor, colored light vs. white light, etc.). The different casings 210 may include the same or similar attachment mechanisms such that they may all be interchangeable to removably attach to neck 218 or the configuration area 108 of protective assembly 100.

Moving forward, it should be noted that configuration area 108 on protective assembly 100 may include other types of configurations or mechanisms for casing 210 to be configured with protective assembly 100. For example, configuration area may include side slots within lower cavity 110 that casing 210 may be slidably configured within. In this example, lower cavity 110 may extend all the way to the top 122 of protective assembly 100 so that casing 210 may slide within lower cavity 110 from a lower position to an upper position that positions lighting assembly 200 above the top 122 of protective assembly 100. In this example, casing 210 may include a neck that may be generally configured below casing 210 such that the neck may support casing 210 when casing 210 is placed in the upper position extending above the top of protective assembly 100. It may also be preferable for casing 210 to have lighting assemblies 200 on its front side 212 and its back side 214 so that it may operate with both the front-side camera 26 and the backside camera 24. In this example, electronic device 20 and/or lighting assembly 200 may identify what position casing 210 may be configured in, and may choose what lighting assembly 200 on what side of casing should be utilized.

In another example of this type, it may be preferable for casing 210 to be mounted on its lower neck with a rotatable mount that may allow casing 210 to swivel about the top of the lower neck. In this way, casing 210 and lighting assembly 200 may be rotated to be positioned to face the same direction as front-side camera 26 or may be rotated to face the same direction as backside camera 24. Note that casing 210 and lighting assembly 200 may be swiveled, rotated or otherwise positioned in any orientation with respect to protective assembly 100.

In all of the embodiments disclosed above, it should be noted that additional devices, components or elements may also be configured with neck 218 and rotatable mount 114. In this way, other devices, components or elements may also be utilized in a lower position, rotated from a lower position to an upper position, and utilized in the upper position as described above with reference to how casing 210 and lighting assembly 200 may be utilized.

In one example, the additional device, component or element may include at least one camera. For instance, a higher quality or different type of camera compared to the native cameras preinstalled on device 20 (e.g. a HD camera, a 360 degree camera, or other type of camera) may be configured with neck 218 and rotatable mount 114. In this way, the additional camera may be used for traditional pictures by configuring neck 218 and the camera into the lower position (as represented by FIG. 1 but with the additional camera configured with neck 218 instead of casing 210). In addition, the additional camera may also be used for "selfies" when neck 218 and the additional camera are placed in the upper configuration (as depicted in FIG. 3 but with the additional camera configured with neck 218 instead of casing 210).

It should be noted that all of the descriptions regarding device 10 and its various assemblies and components may also be applied to this embodiment as applicable. For instance, the additional camera may receive power from power supply 128, or the additional camera may include its own dedicated power source or battery. The additional camera may also be detachable.

Note also that the additional components or elements (such as the camera in the example above) may be configured with neck 218 and rotatable mount 114 in addition to or instead of casing 210 and/or lighting assembly 200. That is, both casing 210 and the additional component (e.g. an additional camera) may both be configured with protective assembly 100 simultaneously. In this way, multiple components or elements may be configured simultaneously with neck 218 and rotatable mount 114 as required.

Additional functionality of device 10 may include a microphone that may be included with protective assembly 100 or with casing 210 that may be used during the photography or videography. In addition, protective assembly 100 may include a stand that may be retractable that may provide stability to protective assembly 100 so that it may stand somewhat upright on a table, desk or on any other surface in landscape and portrait positions.

Although certain presently preferred embodiments of the invention have been described herein, it will be apparent to those skilled in the art to which the invention pertains that variations and modifications of the described embodiments may be made without departing from the spirit and scope of the invention.

What is claimed is:

1. A device for providing illumination, comprising:
   a protective case configured to protect an electronic device, said electronic device having a front side facing in a first direction and a back side facing in a second direction; and
   an illumination source that emits light and that is configured with said protective case;
   wherein the illumination source transitions from a first position where it emits light in said first direction to a second position where it emits light in said second direction; and
   wherein said illumination device transitions from said first position to said second position by rotating about at hinge.

2. The device of claim 1, wherein the electronic device includes a first camera on its front side and a second camera on its back side.

3. The device of claim 2, wherein the illumination source provides illumination for said first camera when in said first position, and for said second camera when in said second position.

4. The device of claim 1, further comprising a first power source that provides power to the electronic device and to the illumination source.

5. The device of claim 4, further comprising a second power source distinct from said first power source that provides power to the illumination source.

6. The device of claim 1, wherein the illumination source is removable from the protective case.

7. The device of claim 1, wherein the electronic device is a smartphone or a tablet computer.

8. The device of claim 7 further comprising electronics that control the intensity of the light emitted by the illumination device.

9. The device of claim 7 further comprising electronics that control the timing of the light emitted by the illumination device.

10. The device of claim 7 further comprising electronics that determine whether the illumination source is in the first position or in the second position.

11. The device of claim 1 further comprising electronics that control the intensity of the light emitted by the illumination device.

12. The device of claim 1 further comprising electronics that control the timing of the light emitted by the illumination device.

13. The device of claim 1 further comprising electronics that determine whether the illumination source is in the first position or in the second position.

14. A device for providing illumination, comprising:
    a protective case configured to protect a smartphone, said smartphone having a front side with a front-side camera facing in a first direction, and a back side with a backside camera facing in a second direction; and
    an illumination source that emits light and that is configured with said protective case;
    wherein the illumination source transitions from a first position where it emits light in said first direction to a second position where it emits light in said second direction; and
    wherein said illumination device transitions from said first position to said second position by rotating about at hinge.

15. The device of claim 14, wherein the illumination provides illumination for said front-side camera when in said first position, and for said backside camera when in said second position.

16. The device of claim 14, further comprising a power source that provides power to the electronic device and to the illumination source.

17. The device of claim 16, further comprising a second power source distinct from said first power source that provides power to the illumination source.

18. The device of claim 14, wherein the illumination source is removable from the protective case.

* * * * *